(12) United States Patent
Pavlidis et al.

(10) Patent No.: US 10,580,037 B2
(45) Date of Patent: Mar. 3, 2020

(54) SYSTEM, METHOD, AND NON-TRANSITORY COMPUTER-READABLE STORAGE MEDIA FOR CLASSIFYING A CUSTOMER BASED ON PURCHASE HISTORY OF A PRODUCT OR CLASS OF PRODUCTS AND GENERATING A MESSAGE BASED ON THE CLASSIFICATION

(71) Applicant: Wal-Mart Stores, Inc., Bentonville, AR (US)

(72) Inventors: Yannis Pavlidis, Boulder, CO (US); Mukesh Jain, Burlingame, CA (US); Mindi Yuan, San Bruno, CA (US); Wei Shen, Danville, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 580 days.

(21) Appl. No.: 14/726,188

(22) Filed: May 29, 2015

(65) Prior Publication Data
US 2016/0350803 A1 Dec. 1, 2016

(51) Int. Cl.
*G06Q 30/02* (2012.01)
*G06Q 30/06* (2012.01)

(52) U.S. Cl.
CPC ..... *G06Q 30/0255* (2013.01); *G06Q 30/0631* (2013.01); *G06Q 30/0635* (2013.01)

(58) Field of Classification Search
CPC .......... G06Q 30/0255; G06Q 30/0631; G06Q 30/0635
See application file for complete search history.

(56) References Cited

U.S. PATENT DOCUMENTS

| | | | | |
|---|---|---|---|---|
| 6,336,099 B1 * | 1/2002 | Barnett | ................ | G06Q 20/108 |
| | | | | 705/14.35 |
| 6,616,049 B1 * | 9/2003 | Barkan | .............. | G06K 7/10851 |
| | | | | 235/383 |
| 2002/0107729 A1 * | 8/2002 | Katz | ...................... | G06Q 30/02 |
| | | | | 705/14.53 |
| 2004/0133435 A1 * | 7/2004 | Berlin | ................... | G06Q 30/00 |
| | | | | 705/26.1 |
| 2012/0054000 A1 * | 3/2012 | Boppert | ............. | G06Q 30/0207 |
| | | | | 705/14.1 |
| 2013/0110671 A1 * | 5/2013 | Gray | ..................... | G06Q 30/06 |
| | | | | 705/26.8 |
| 2014/0095285 A1 * | 4/2014 | Wadell | .................. | G06Q 30/00 |
| | | | | 705/14.25 |
| 2015/0220963 A1 * | 8/2015 | Priebatsch | ......... | G06Q 30/0268 |
| | | | | 705/14.38 |
| 2015/0242892 A1 * | 8/2015 | Priebatsch | ......... | G06Q 30/0255 |
| | | | | 705/14.53 |

\* cited by examiner

*Primary Examiner* — Raquel Alvarez
(74) *Attorney, Agent, or Firm* — Bryan Cave Leighton Paisner LLP (57) ABSTRACT

Systems, methods, and computer-readable storage media are provided that allow orders to be made remotely by customers and classify a product or category of products based on a customer's purchasing history of that product and generate a message to the customer based on the classification.

25 Claims, 6 Drawing Sheets

SYSTEM, METHOD, AND NON-TRANSITORY COMPUTER-READABLE STORAGE MEDIA FOR CLASSIFYING A CUSTOMER BASED ON PURCHASE HISTORY OF A PRODUCT OR CLASS OF PRODUCTS AND GENERATING A MESSAGE BASED ON THE CLASSIFICATION

FIELD OF THE DISCLOSURE

The present invention relates to the purchasing of goods or items by a customer, and more particularly, to systems, methods, and computer-readable storage media that classify a product or category of products based on a customer's purchasing history of that product and generates a message to the customer based on the classification.

BACKGROUND

Many customers desire to order items or goods remotely, e.g., on-line, through the Internet, or using a specially designed application or app on a mobile device, such as a tablet or cell phone. The customer may desire that the goods in the order be delivered to their home or that the goods in the order be assembled and ready for the customer to pick-up at a specific location, e.g., a particular store, typically at a specific time.

Some customers may periodically place the same or similar orders. For instance, a customer who orders groceries on-line may make the same order or may include the same items in an order every week, month, etc. . . . While making an order on-line, even adding the same items or goods to their basket may take an unneeded amount of time, e.g., 15 minutes. Thus, it may be desirable to add items directly to their basket to save time and/or for the customer's convenience.

Additionally, if a customer or a regular purchaser of a good or a classification of a good, or if a customer was a regular purchaser of a good or a classification of a good, but no longer purchases the good, then it may be desirable to address the customer with a marketing message.

The present invention is aimed at one or more of the problems identified above.

SUMMARY OF THE INVENTION

In different embodiments of the present invention, systems, methods, and computer-readable storage media allow orders to be made remotely by customers and to classify a product or category of products based on a customer's purchasing history of that product and generate a message to the customer based on the classification.

In one embodiment, a system comprising a memory unit, a classification unit, and a messaging unit. The memory unit is configured to store information related to customer orders and information associated with a plurality of customers in an associated customer record. Each customer record includes a list of goods purchased by the respective customer and associated time data. The classification unit generates a purchase classification associated with one of the customers and one of the goods purchased by the one of the customers as a function of the time data associated with the purchase by the one of the customers of the one of the goods. The messaging unit generates a message for the one of the customers as a function of the purchase classification and the time data associated with past purchases by the one of the customer of the one of the goods.

In another embodiment a method is provided. The method includes the step of storing, in a memory unit, information related to customer orders and information associated with a plurality of customers in an associated customer record. Each customer record includes a list of goods purchased by the respective customer and associated time data. The method further includes the step of generating a purchase classification associated with one of the customers and one of the goods or categories of goods purchased by the one of the customers as a function of the time data associated with the purchase by the one of the customers of the one of the goods. The method also includes the step of generating a message for the one of the customers as a function of the purchase classification and the time data associated with past purchases by the one of the customer of the one of the goods.

In still another embodiment, one or more non-transitory computer-readable storage media, having computer-executable instructions embodied thereon are provided. When executed by at least one processor, the computer-executable instructions cause the processor to operate as a memory unit, a classification unit, and a messaging unit. The memory unit is configured to store information related to customer orders and information associated with a plurality of customers in an associated customer record. Each customer record includes a list of goods purchased by the respective customer and associated time data. The classification unit generates a purchase classification associated with one of the customers and one of the goods purchased by the one of the customers as a function of the time data associated with the purchase by the one of the customers of the one of the goods. The messaging unit generates a message for the one of the customers as a function of the purchase classification and the time data associated with past purchases by the one of the customer of the one of the goods.

BRIEF DESCRIPTION OF THE FIGURES

Other advantages of the present disclosure will be readily appreciated, as the same becomes better understood by reference to the following detailed description when considered in connection with the accompanying drawings wherein:

Non-limiting and non-exhaustive embodiments of the present invention are described with reference to the following figures, wherein like reference numerals refer to like parts throughout the various views unless otherwise specified.

FIG. 7 is a flowchart of a method that may be used with the system shown in FIG. 1, according to an embodiment of the present invention; and, Corresponding reference characters indicate corresponding components throughout the several views of the draw-} ings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The disclosure particularly describes how a customer may order goods on-line or remotely and arrange to pick-up the order at a specified location, such as a store or to have the goods in the order delivered to the customer. Particularly, the present disclosure describes how a system assigns a classification to a good based on the purchase history for the good or a category of goods that includes the good relative to a customer. As discussed, more fully below a message may be directed to the customer based on the classification. It should also be noted that a customer may includes a plurality of customers that are grouped together based on common parameters, e.g., a family or group of persons living in the same household.

With reference to the FIGS. and in operation, the present invention provides a system 10, methods and computer product media that facilitates the assembly of an order for a customer that the customer may desire to pick-up at a specification location, e.g., a store or to have delivered.

Figure 1:
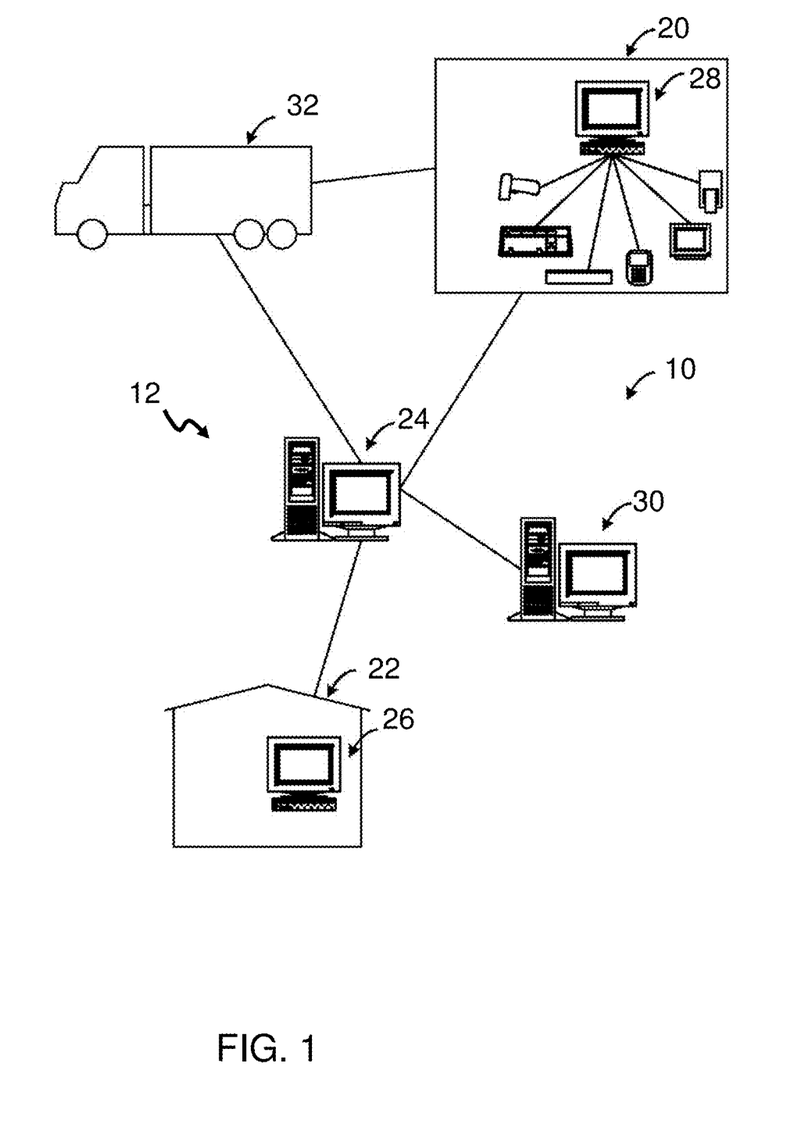
FIG. 1 is a schematic illustrating various aspects of a system according to the present disclosure.

Referring to FIG. 1, an exemplary environment in which the system 10 operates is illustrated. A customer may desire to purchase items from a facility at a specified location, such as a store 20. The store 20 may be representative of a larger corporate environment which may provide many avenues of interface with a customer. In a modern shopping environment, a store 20 may include both one or more brick and mortar retail locations and an on line retail location.

It should be noted that the store 20 may include, or be part of, a plurality of stores 20. The customer, as explained below, may be allowed to choose the store from the plurality of stores 20.

Generally, the customer may desire to order items from the store 20 and have the items (or goods) delivered to a customer location 22 such as the customer's residence, business, etc. . . . Alternatively, the customer may desire to pick-up the order from the store 20.

The system 10, in addition to facilitating the assembly of the order at the store, may be configured to allow or facilitate orders to be efficiently delivered to the customer location 22 and to allow orders to be delivered to the customer location 22 or to be picked up at a selected store 20. The customer may desire and request that the order be delivered or picked up the same day that the order is placed or a future day. Furthermore, the customer may request a delivery or pick-up time.

For clarity in discussing the various function of the system 10, multiple computers and/or servers are discussed as performing different functions in providing goods to a customer in response to a customer order. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

The computer system 10 may include or have an associated first server or order server 24. The first server 24 may host a store webpage which allows a customer to, via a customer device 26, interact with the store 20 and first server 24 to place an order for one or more items or goods from the store 20. Alternatively, the first server 24 may communicate and interact directly with the customer device 26 via appropriate software applications or apps running on the first server 24 and the customer device 26.

The first server 24 may include a database of items which are for sale within the store 20 with information relevant to these items. The first server 24 may include software to allow delivery of items to a customer or to facilitate pick-up of the items from the store 20 by the customer. Particularly, the first server 24 may provide an internet webpage to allow a customer to select items, select or enter delivery or pick-up information, and purchase the items in a virtual shopping environment. The first server 24 may communicate with other computers, servers, or components of the system 10 to deliver the items to the customer or to arrange for pick-up of the items (see below).

The system 10 may also include a second server 28. The second server 28 may interact with the store 20 and assist the store employees in picking items for orders and assembling the order. The second server 28 and other hardware components that may be located at the store or facility may be referred to as an order fulfillment system 12.

The system 10 may also include a third server 30. The third server 30 may manage delivery routes for a delivery service 32 which delivers goods to a customer. The third server 30 may determine when, during a day, there is sufficient time to deliver an order to the customer and may provide information to the first server 24 to allow the store server to provide customized information to the customer during the ordering process to allow the customer to select a desired delivery window which may be fulfilled by the store 20 and delivery service 32.

A customer purchasing items from the store 20 for delivery to a customer location 22 or pick-up at a store 20 will typically view an internet webpage or access an application or app corresponding to the store. The customer may have an account with the store and may sign into the system 10. A customer account may include information about the customer such as name, address, past purchase history, etc. The webpage or app may display to the customer items at the store 20 which are available for pick-up or delivery. Not all items may be available for pick-up (at a specific or selected store) or for delivery. The customer may select items or goods for purchase. In signing into an account or entering information for a purchase, the first server 24 may receive (from the customer) customer information which facilitates delivery of goods to the customer. Particularly, the first server 24 may receive the address of the customer location 22 where purchased items are to be delivered. Alternatively, the first server 24 may receive a customer selection of a store 20 at which the customer desires to pick-up the order as well as a customer motor vehicle license plate number.

The first server 24 may provide customer information, such as the address of the customer location 22, to the third server 30. The third server 30 may use the customer information to determine time periods during the day when a delivery service 32 may deliver the items to the customer. The third server 30 may manage multiple delivery trucks/routes throughout the day for the delivery service 32 and may determine how much time a delivery truck has available and how much time is required to deliver the items to the customer location 22. The third server 30 may determine when during the day a delivery truck (or other service vehicle) may deliver the items to the customer. The third server 30 may provide information regarding when the delivery service 32 is able to deliver items to the customer location 22 to the first server 24. One embodiment of the system 10 and the delivery of the orders to the customer location 22 using the delivery service 32 is described within commonly owned U.S. Patent Application Publication No. 2014/0095350, published Apr. 3, 2014, which is hereby incorporated by reference.

Figure 2:
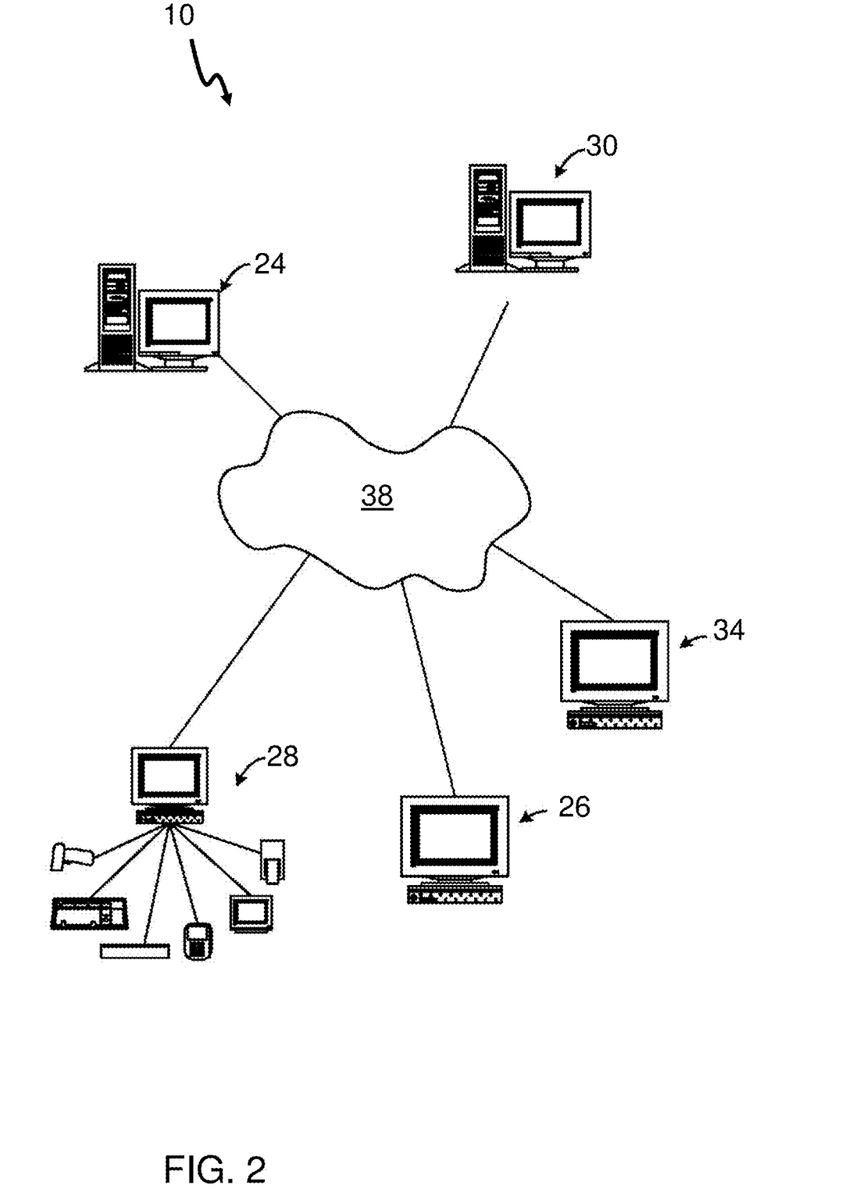
FIG. 2 is a schematic illustrating a portion of the system of FIG. 1 in context of order fulfillment and delivery, according to an embodiment of the present invention.

Referring to FIG. 2, in selected embodiments, the software, hardware, and associated components of the system 10 may be programmed and configured to implement one or more embodiments described herein. A customer may communicate with the first server 24 via the customer device 38 and a communications connection or network 42 to select items for purchase. The first server 24 may also communicate with a third server 30, delivery service 32, and second server 28 via a communications connection 42. The communications connection 42 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The customer device 26 may include any suitable device, including, but not limited to, a desktop computer, a laptop or notebook computer, a tablet, a handheld mobile device including a cellular telephone, and the like.

Figure 3:
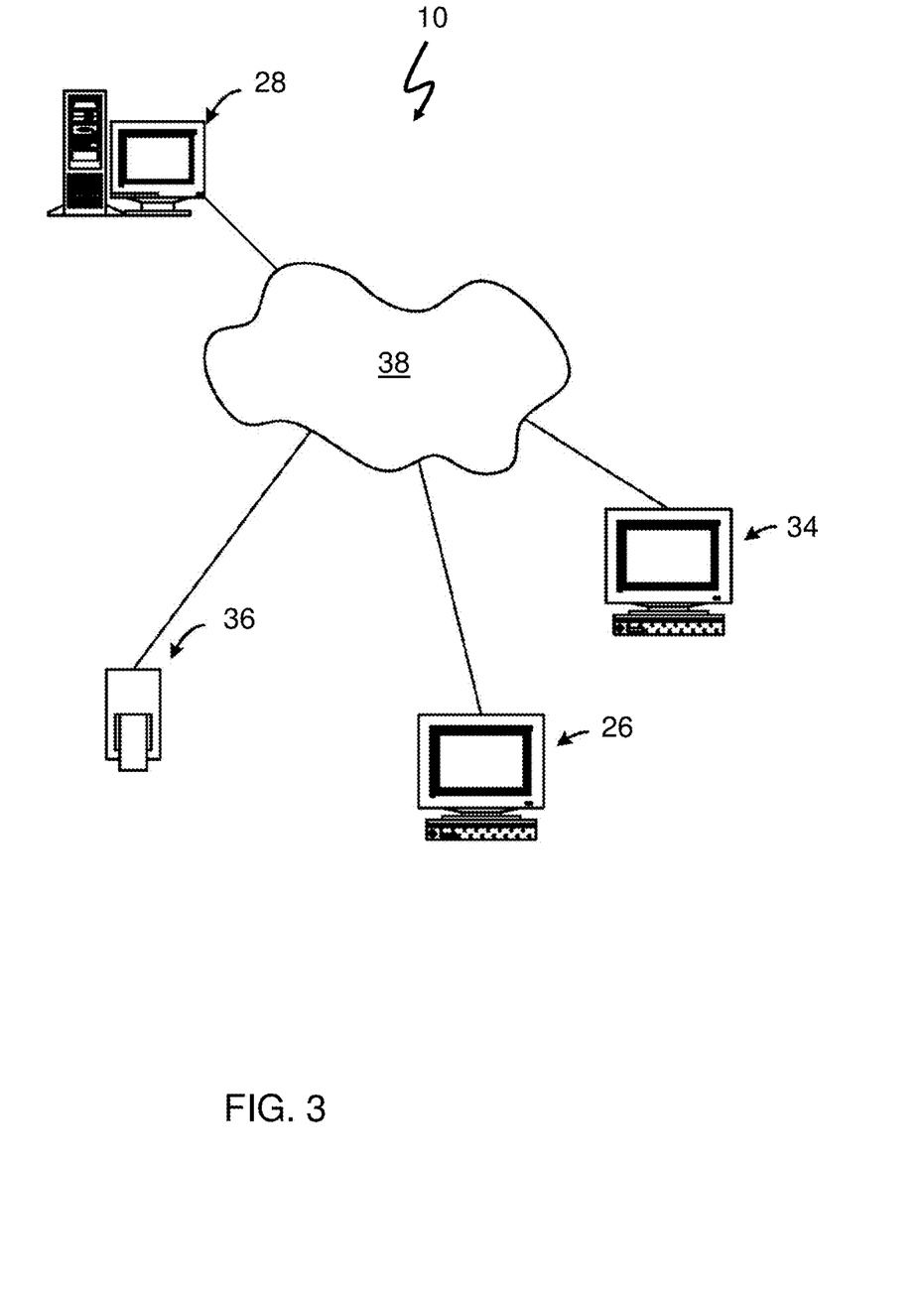
FIG. 3 is a second schematic illustrating a portion of the system of FIG. 1 in context of order fulfillment and delivery, according to an embodiment of the present invention.

Referring to FIG. 3, in selected embodiments, the hardware, software, or hardware and software of first server 24, the second server 28, and the third server 30 may be configured to receive and utilize item information as described herein, performing functions associated with the first server 24 and second server 28. The second server 28 may communicate with the customer device 26, a delivery service computer 34, and an assembler device, such as a store handheld device, 36 via a communications connection or network 38. In this manner, the various aspects of the system may be exemplified as software, modules, nodes, etc. of a store computer or second server 28.

Figure 4:
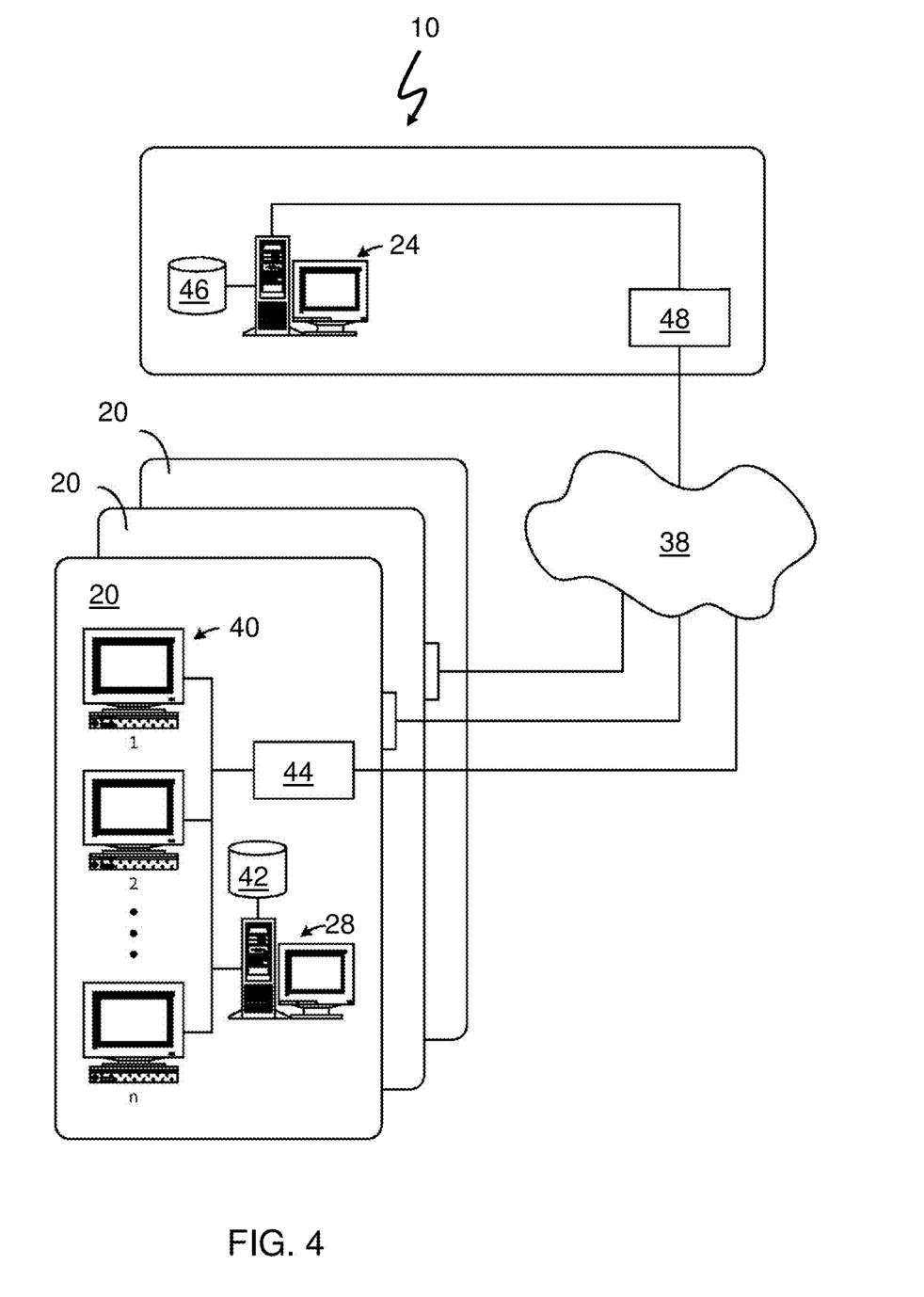
FIG. 4 is a schematic illustrating the system of FIG. 1 in a multiple store environment, according to an embodiment of the present invention.

Referring to FIG. 4, in selected embodiments, the system 10 may operate substantially independently, as a stand-alone unit. Alternately, a store system 10 may operate as a larger system. For example, multiple stores 20 may operate at different locations (e.g., different brick-and-mortar stores, facilities, and/or warehouses). In such embodiments, each local system may have a second server 28 as well as other computers or handheld devices 40, database and data storage devices 42, and networking devices 44 as necessary. Each local system may be connected to the first server 24 via a network or internet connection 38. The first server 24 may be associated with database and data storage device 46 and a network device 48 as necessary.

As discussed above, the customer way desire to pick-up the order at a selected store 20. The system 10 may be configured to establish that the customer has arrived at the selected store 20 and arrange for the final assembly of the customer's order and for it to be delivered to the customer's motor vehicle, e.g., automobile, without the customer having to manually "announce" that the customer has arrived at the store 20.

In another aspect of the present invention, the system 10 is aimed at assisting the customer in making a customer order more efficient and quicker. For instance, in one aspect of present invention, the customer orders the same goods or items on periodic basis then the customer's virtual cart or shopping cart may be populated with a list of goods that the customer typically, or commonly, orders. One such system is disclosed in commonly owned U.S. patent application Ser. No. 14/549,292, filed Nov. 20, 2014 which is hereby incorporated by reference.

In one aspect, system 10 includes creates a customer record for each customer when the customer signs up or creates an account. The customer record is stored within the system 10, for example, in a memory unit, in a database, or other computer record or device (see below). As discussed in more depth below, the customer record may include one or more preset lists of goods. Each preset list may have an associated time data. The time data may include, but is not limited to, week, day, or hour data. As will be described more fully below, preset lists may be created automatically (based on customer historical orders) and/or created by the customer.

Each customer record may also include past purchase associated with the customer, including the products purchased as well as time data, e.g., date and time, associated with each purchase.

A customer may use a store website or specially designed application or app to order various items for delivery to a customer location 22 or pick-up at a specified store 20. In an on-line store environment, the customer may browse through available items and may select items for purchase. The first server 24 may receive customer information. A customer may create an account or logon to an existing account with the first server 24, or may enter this information while making a purchase. The first server 24 transmits customer information and the customer order to the second server 28.

Figure 5:
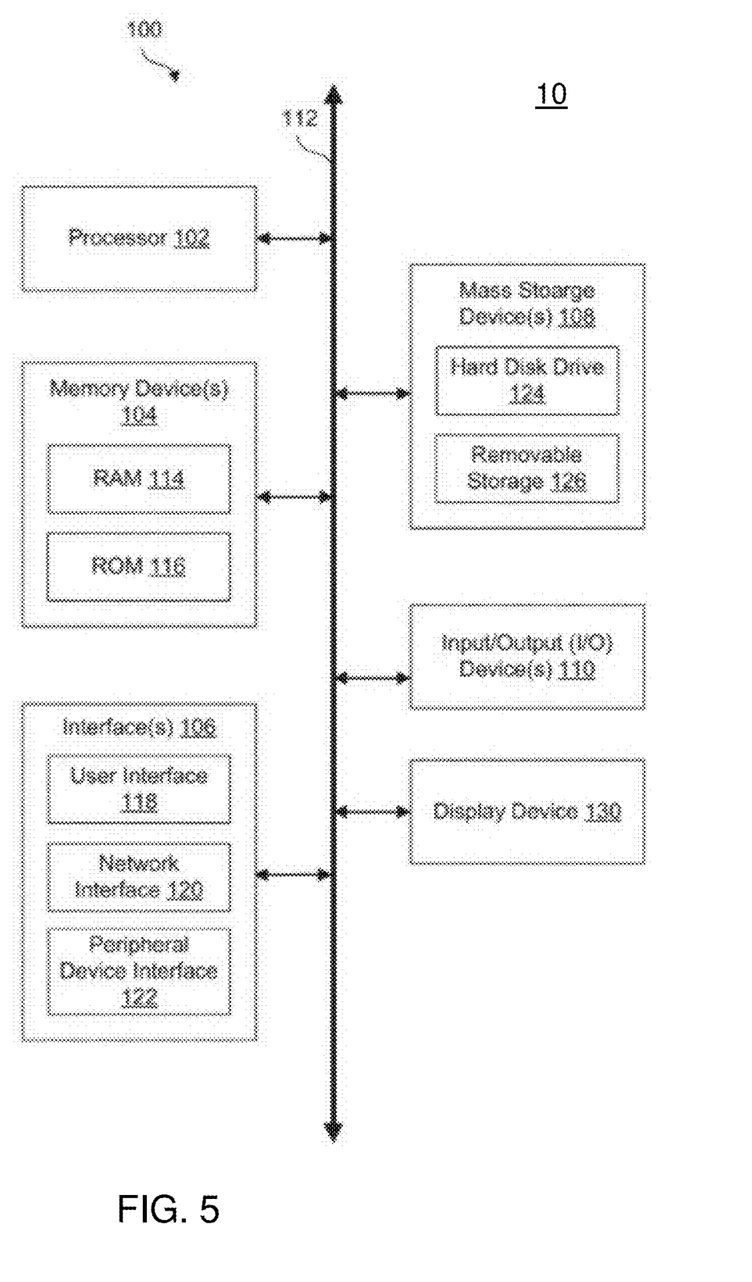
FIG. 5 is a schematic illustrating various aspects of a system, according to the present disclosure.

FIG. 5 is a block diagram illustrating an example computing device 100. Computing device 100 may be used to perform various procedures, such as those discussed herein. Computing device 100 can function as a server, a client, or any other computing entity. Computing device 100 can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory unit(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory unit(s) 104 and/or mass storage device(s) 108. Processor(s) 102 may also include various types of computer-readable media, such as cache memory.

Memory unit(s) 104 include various computer-readable media, such as volatile memory (e.g., random access memory (RAM) 114) and/or nonvolatile memory (e.g., read-only memory (ROM) 116). Memory unit(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interfaces include user interface 118 and peripheral device interface 122.

Bus 112 allows processor(s) 102, memory unit(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 6:
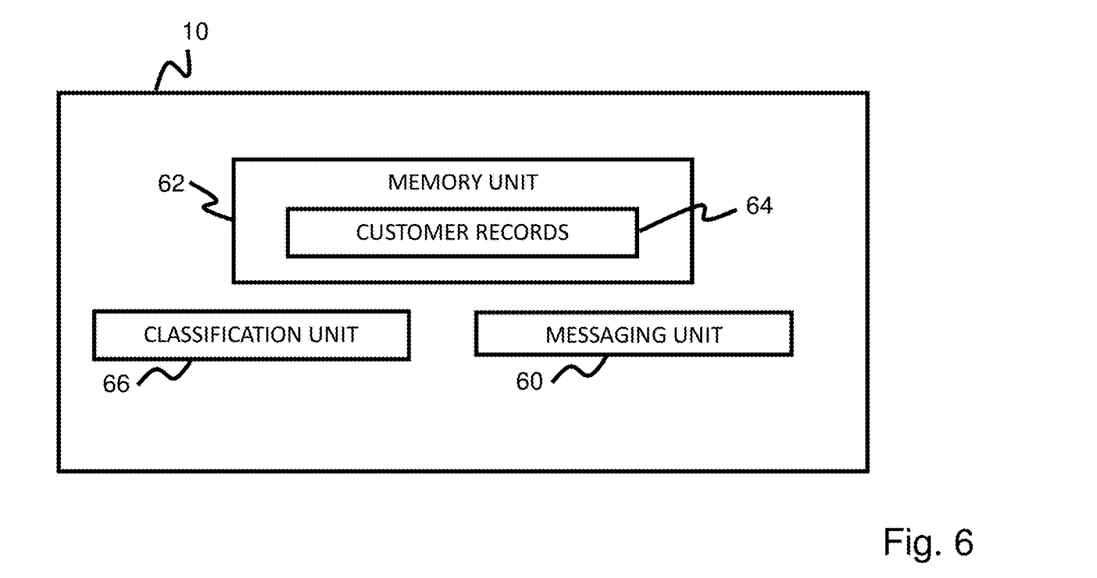
FIG. 6 is a functional schematic of the present invention, according to an embodiment of the present invention.

With reference to FIG. 6, in one embodiment of the present invention the system 10 includes a memory unit 62, a classification unit 66, and a messaging unit 60.

The memory unit 62 is configured to store information related to customer orders, i.e., historical purchase history, and information associated with a plurality of customers in an associated customer record 64. Each customer record 64 may include a list of goods purchased by the respective customer and associated time data, e.g., the date and time at which the goods were purchased.

The classification unit 66 is coupled to the memory unit 62 and is configured to generate a purchase classification associated with one of the customers and one of the goods purchased by the one of the customers as a function of the time data associated with the purchase by the one of the customers of the one of the goods.

The messaging unit 60 coupled to the memory unit 62 and the classification unit 66 and is configured to generate a message for the one of the customers as a function of the purchase classification and the time data associated with past purchases by the one of the customer of the one of the goods, i.e., frequency of purchases of a particular good or class of goods.

In one aspect of the invention, the message may be a notification that, based on the customer's past purchasing history, it may be time to purchase the good (or item). For example, if the customer's part purchasing history indicates that the customer purchases laundry detergent every four weeks, then at 3 weeks since the customer's last purchase of laundry detergent, the messaging unit 50 may send a message or notification to the customer. The notification may be in the form of an email, text message, and/or a message sent to the user in the application, app, or to their online account. Alternatively, or in addition, the message or notification may be in form of the addition of the good or product to a preset list which is added to the customer's virtual online shopping cart the next time the customer access the retailer's website, application or app.

In one aspect of the present invention, a message or notification and/or the classification of a good or item relative to a customer is based on the customer interval purchase interval or IPI for the particular good. An IPI can be determined at the good level, e.g., a particular brand and type of a good, such a specific laundry detergent and/or at the category/subcategory level, e.g., laundry detergent. In general, IPIs may be calculated on a per customer basis, item or subcategory pair (see below) and different IPIs across different items. As will explained more fully below, IPIs may be used in generating different types of messages or notification, including, but not limited to reminders to purchases specific products or a product within a category/subcategory, delivery of offers, e.g., coupons, of a discount to purchase a specific good or a good within a category/subcategory and/or an invitation to enroll in a subscription to a product.

In another aspect of the present invention, the message generated for a customer may be based, at least in part, on the classification generated (or assigned) to the customer for a specific good and/or category/subcategory of goods.

For instance, in one embodiment of the present invention, a good, category, or subcategory may be classified, for a specific customer, as a "regular" or "lapsed". In general, a good is "regular" if the customer is a regular purchaser of the item and a good is "lapsed" if the customer was previously a regular purchaser of the item, but is no longer a regular purchaser of the item.

In general, only certain types of messages may be sent to customers for goods classified as regular and only certain types of messages may be sent to customers for goods classified as lapsed. For instance, if a customer is a regular purchaser of a particular brand of a good, it may not be desirable to send the customer a coupon or other offer for that good, since the customer may be likely that the customer may purchase the particular good without the offer. However, it may be desirable to send the customer a reminder that it is time to purchase the good or to offer enrollment in a subscription to purchase the good. In at least one embodiment, a coupon or other offer or discount for a particular good would not be sent if the customer is a regular purchaser of the particular good.

In contrast, it may be desirable to send an offer or discount for a product for which the customer is a lapsed purchaser of the good in order to entice the customer back to making such a purchase.

Additionally, it may be desirable to review a customer's purchasing history and identify a condition in which a customer is a regular purchaser of goods in a specific category/subcategory of goods but who is not a regular purchaser of any specific good within the category/subcategory. For instance, a customer may be a regular purchase of laundry detergent or diapers, but not a regular purchaser of any specific good within the category/subcategory. This may be indicative that the customer does not have any brand affinity within that category/subcategory but most likely is sensitive to price. Thus, a coupon or offer for any good within the category/subcategory may be sent. For example, if the customer is (known to be) price sensitive then the message could include a suggestion (with or without a coupon or offer) for a less or the least expensive good or item within the category or subcategory.

In one embodiment of the present invention, the message for the customer is a request to order the one of the goods.

In one embodiment of the present invention the purchase classification is one of regular and lapsed. The message may include an offer related to the one of the goods if the classification of the customer is lapsed. The offer may be, for example, a request to order the one of the goods or a request that the customer become a subscriber to the one of the goods if the customer is regular.

In another aspect of the present invention, if the offer includes a request that the customer becomes a subscriber to a good, the messaging unit may be further configured to receive a reply from the customer, to responsively, establish the customer as a subscriber to the one of the goods, and to automatically order the one of the goods on behalf of the customer at an interval and start date defined by the past purchases of the one of the products by the customer.

In one aspect of the present invention, a good is classified as regular relative to a specific customer if a number of historical purchases is greater than a predetermined threshold multiplied by the average number of overall purchases of the one of the goods and an associated variance is less than a square of a number of days between consecutive purchases of the one of the goods.

A good may be classified as lapsed relative to a specific customer if the one of the goods was previously classified as regular and a number of days since a last purchase by the one of the customers is greater than a predetermined threshold multiplied by a number of days between consecutive purchases of the one of the goods.

Figure 7:
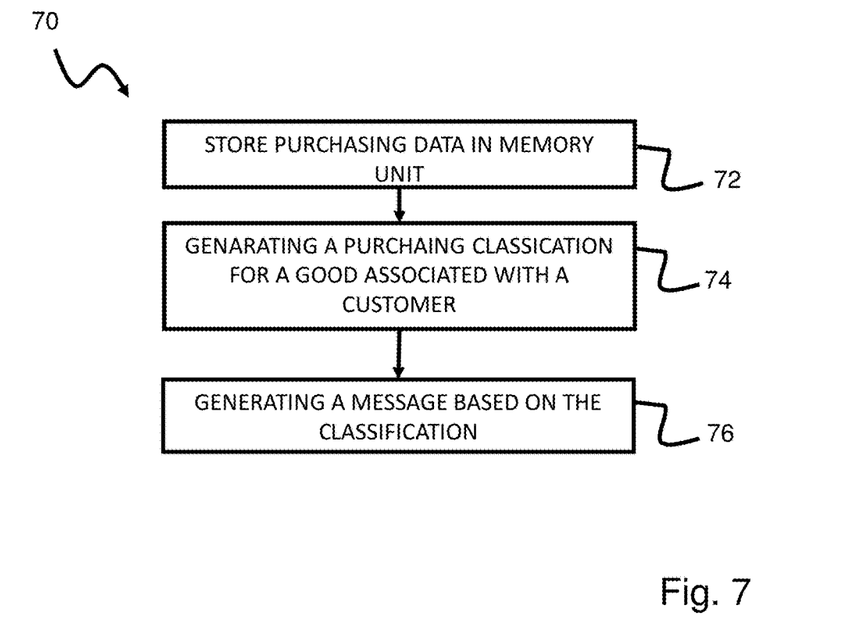

With reference to FIG. 7, in another aspect of the present invention, a method 80 is provided. In a first step 72, information related to customer orders and information associated with a plurality of customers is stored in the memory unit 62 in associated customer records. Each customer record may include a list of goods purchased by the respective customer and associated time data. In a second step 74, a purchase classification associated with one of the customers and one of the goods purchased by the one of the customers is generated as a function of the time data associated with the purchase by the one of the customers of the one of the goods. And in a third step 76, a message is generated for the one of the customers as a function of the purchase classification and the time data associated with past purchases by the one of the customer of the one of the goods.

In one embodiment of the present invention, the memory unit 62 may include one or more of the memory units 104 and/or mass storage devices 108 of one or more of the computing devices 100. The units that comprise the invention are composed of a combination of hardware and software, i.e., the hardware as modified by the applicable software applications. In one embodiment, the units of the present invention are comprised of one of more of the components 102, 104, 106, 108, 110, 112, 130 of one or more of the computing devices (whether computer/network server 202A, 202b, 202C, computing asset 210a, 20b, or terminal 20ga, 206b, 206c), as modified by one or more software applications.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system, comprising:
one or more processors; and
memory storing one or more programs to be executed by the one or more processors, the one or more programs comprising instructions for:
generating, in a memory unit, a customer record of a customer with information related to customer orders, purchase history, and account information associated with the customer;
using the customer record to automatically generate a preset list of goods purchased by the customer based on historical orders and time data comprising dates and times when the historical orders were made, wherein the purchase history comprises the historical orders, and wherein a number of goods on the preset list of goods varies according to the dates and the times that goods in the historical orders were purchased;
transmitting, via the memory unit to a classification unit, data associated with the historical orders, wherein the classification unit is configured to analyze the data to determine a purchase classification of a good;
determining, via the classification unit, the purchase classification of the good by filtering the purchase history of the customer and classifying the good as either a regular good or a lapsed good as a function of the time data associated with a frequency of purchases of the good, wherein:
the classification unit classifies the good as the regular good specific to the customer when a number of the historical orders of the good is greater than a predetermined threshold multiplied by an average number of overall purchases of the good, and is less than a square of a number of days between consecutive purchases of the good; and
the classification unit reclassifies the good from the regular good to the lapsed good specific to the customer when a number of days since a last purchase of the regular good is greater than a value of the predetermined threshold multiplied by a number of days between consecutive purchases of the good;

determining, via the classification unit, whether the customer has a brand affinity for the good by identifying a brand more frequently purchased than other brands associated with the good classified as (a) the regular good or (b) the lapsed good specific to the customer;

receiving, via the one or more processors, an order associated with a virtual shopping basket from a mobile device of a customer;

populating, via the one or more processors, the virtual shopping basket with the preset list of goods;

generating, via a messaging unit coupled to the memory unit and the classification unit, a message for the customer as a function of the purchase classification of the good, the brand affinity for the good, and the time data associated with past purchases by the customer of the good, wherein:

when the good is classified as the regular good and when a predetermined number of weeks has passed without a purchase of the regular good by the customer, the messaging unit automatically sends the message to the customer, wherein the message comprises a notification that the regular good has been added to a list of goods in the virtual shopping basket for the customer, and wherein the predetermined number of weeks is based on a purchasing pattern of the customer of the regular good; and when the good is classified as the lapsed good, the messaging unit sends the message to the customer, wherein the message comprises a discount for the lapsed good; and sending instructions to display the preset list of goods and the message to the mobile device of the customer.

2. The system, as set forth in claim 1, further comprising:
an order fulfillment system coupled to the memory unit and being located at a facility, the order fulfillment system being configured to receive a customer order by the mobile device of the customer and to assist in assembling the customer order for the customer.

3. The system, as set forth in claim 2, wherein the message for the customer is a request to add the good to the virtual shopping basket.

4. The system, as set forth in claim 1, wherein the message for the customer is a request to order the good.

5. The system, as set forth in claim 1, wherein the purchase classification further comprises a factor of price sensitivity.

6. The system, as set forth in claim 1, wherein, when the good is classified as the regular good and when the predetermined number of weeks has passed without the purchase of the regular good by the customer, the message further comprises an offer to enroll the customer in a subscription to purchase the good related to the preset list of goods associated with the dates and the times that the regular good was purchased.

7. The system, as set forth in claim 1, wherein, when the good is classified as the lapsed good, the message further comprises at least one of a request to order the good or a request that the customer become a subscriber to the good.

8. The system, as set forth in claim 7, wherein the messaging unit is further configured to receive a reply from the customer to establish the customer as a subscriber to the good, and to automatically order the good on behalf of the customer at an interval defined by the past purchases of the good by the customer.

9. The system, as set forth in claim 1, wherein the good is classified as the regular good when the customer continues to purchase the good on the preset list of goods associated with the dates and the times that the good was purchased.

10. The system, as set forth in claim 9 where the good is classified as the lapsed good when the customer no longer purchases the good on the preset list of goods associated with the dates and the times that the regular good was purchased.

11. The system, as set forth in claim 1, wherein a plurality of goods, comprising the good, is within a sub-category of goods, the classification unit being further configured to generate the purchase classification associated with the sub-category of goods.

12. The system, as set forth in claim 11, wherein the message comprises an offer related to any one of the plurality of goods in the sub-category of goods if the purchase classification of the sub-category of goods is regular and the purchase classification of the one of the plurality of goods is the lapsed good.

13. A method, comprising:
generating, with a computer system using one or more processors, a customer record of a customer with information related to customer orders, purchase history, and account information associated with the customer, using the customer record to automatically generate a preset list of goods purchased by the customer based on historical orders and time data comprising dates and times when the historical orders were made, wherein the purchase history comprises the historical orders, and wherein a number of goods on the preset list of goods varies according to the dates and the times that goods in the historical orders were purchased;

transmitting, via a memory unit to a classification unit, data associated with the preset list of goods, wherein the classification unit is configured to analyze the data to determine a purchase classification of a good;

determining, with the computer system, via the classification unit, the purchase classification of the good by filtering the purchase history of the customer and classifying the good as either a regular good or a lapsed good as a function of the time data associated with a frequency of purchases of the good, wherein:

the classification unit classifies the good as the regular good specific to the customer when a number of the historical orders of the good is greater than a predetermined threshold multiplied by an average number of overall purchases of the good, and is less than a square of a number of days between consecutive purchases of the good; and the classification unit reclassifies the good from the regular good to the lapsed good specific to the customer when a number of days since a last purchase of the regular good is greater than a value of a predetermined threshold multiplied by a number of days between consecutive purchases of the good;

determining, via the classification unit, whether the customer has a brand affinity for the good by identifying a brand more frequently purchased than other brands associated with the good classified as (a) the regular good or (b) the lapsed good specific to the customer;

receiving, by the computer system, an order associated with a virtual shopping basket from a mobile device of a customer;

populating, by the computer system, the virtual shopping basket with the preset list of goods;

generating, with the computer system, via a messaging unit coupled to the memory unit and the classification unit, a message for the customer as a function of the purchase classification of the good, the brand affinity for the good, and the time data associated with past purchases by the customer of the good, wherein:

when the good is classified the regular good and when a predetermined number of weeks has passed without a purchase of the regular good by the customer, the messaging unit automatically sends the message to the customer, wherein the message comprises a notification that the regular good has been added to a list of goods in the virtual shopping basket for the customer, and wherein the predetermined number of weeks is based on a purchasing pattern of the customer of the regular good; and when the good is classified as the lapsed good, the messaging unit sends the message to the customer, wherein the message comprises a discount for the lapsed good; and sending instructions to display the preset list of goods and the message to the mobile device of the customer.

14. The method, as set forth in claim 13, comprising:
receiving, at an order fulfillment system coupled to the memory unit and being located at a facility, a customer order by the mobile device of the customer and to assist in assembling the customer order for the customer.

15. The method, as set forth in claim 14, wherein the message for the customer is a request to add the good to the virtual shopping basket.

16. The method, as set forth in claim 13, wherein the message for the customer is a request to order the good.

17. The method, as set forth in claim 13, wherein the purchase classification is one of further comprises a factor of price sensitivity.

18. The method, as set forth in claim 13, wherein, when the good is classified the regular good and when the predetermined number of weeks has passed without the purchase of the regular good by the customer, the message further comprises an offer to enroll the customer in a subscription to purchase the good related to the preset list of goods associated with the dates and the times the regular good was purchased.

19. The method, as set forth in claim 13, wherein, when the good is classified the lapsed good, the message further comprises at least one of a request to order the good or a request that the customer become a subscriber to the good.

20. The method, as set forth in claim 19, comprising receiving a reply from the customer, wherein the messaging unit, establishing the customer as a subscriber to the good, and automatically ordering the good on behalf of the customer at an interval defined by the past purchases of the good by the customer.

21. The method, as set forth in claim 13, wherein the good is classified as the regular good when the customer continues to purchase the good on the preset list of goods associated with the dates and the times the regular good was purchased.

22. The method, as set forth in claim 13, wherein the good is classified as the lapsed good when the customer no longer purchases the good on the preset list of goods associated with the dates and the times the regular good was purchased.

23. The method, as set forth in claim 13, wherein a plurality of goods, comprising the good, are within a sub-category of goods, the classification unit being further configured to generate a purchase classification associated with the sub-category of goods.

24. The method, as set forth in claim 23, wherein the message comprises an offer related to any one of the plurality of goods in the sub-category of goods if the purchase classification of the sub-category of goods is regular and the purchase classification of the one of the plurality of goods is the lapsed good.

25. One or more non-transitory computer-readable storage media, having computer-executable instructions embodied thereon, wherein when executed by at least one processor, the computer-executable instructions cause the at least one processor to operate as:

generating a customer record of a customer with information related to customer orders, purchase history and account information associated with the customer;

using the customer record to automatically generate a preset list of goods purchased by the customer based on historical orders and time data comprising dates and times when the historical orders were made, wherein the purchase history comprises the historical orders, and wherein a number of goods on the preset list of goods varies according to the dates and the times that goods in the historical orders were purchased;

transmitting, via a memory unit to a classification unit, data associated with the preset list of goods, wherein the classification unit is configured to analyze the data to determine a purchase classification of a good;

determining, via the classification unit, the purchase classification of the good by filtering the purchase history of the customer and classifying the good as either a regular good or a lapsed good as a function of the time data associated with a frequency of purchases of the good, wherein:

the classification unit classified the good as the regular good specific to the customer when a number of the historical orders of the good is greater than a predetermined threshold multiplied by an average number of overall purchases of the good, and is less than a square of a number of days between consecutive purchases of the good; and the classification unit reclassifies the good from the regular good to the lapsed good specific to the customer when a number of days since a last purchase of the regular good is greater than a value of the predetermined threshold multiplied by a number of days between consecutive purchases of the good;

determining, via the classification unit, whether the customer has a brand affinity for the good by identifying a brand more frequently purchased than other brands associated with the good classified as (a) the regular good or (b) the lapsed good specific to the customer;

receiving an order associated with a virtual shopping basket from a mobile device of a customer;

populating the virtual shopping basket with the preset list of goods;

generating via a messaging unit coupled to the memory unit and the classification unit, a message for the customer as a function of the purchase classification of the good, the brand affinity for the good, and the time data associated with past purchases by the customer of the good, wherein:

when the good is classified as the regular good and when a predetermined number of weeks has passed without a purchase of the regular good by the customer, the messaging unit automatically sends the message to the customer, wherein the message comprises a notification that the regular good has been added to a list of goods in the virtual shopping basket for the customer, and wherein the predetermined number of weeks is based on a purchasing pattern of the customer of the regular good; and when the good is classified the lapsed good, the messaging unit sends the message to the customer, wherein the message comprises a discount for the lapsed good; and sending instructions to display the preset list of goods and the message to the mobile device of the customer.

* * * * *